United States Patent [19]

Emory, Jr.

[11] Patent Number: 4,809,937

[45] Date of Patent: Mar. 7, 1989

[54] CABLE PENETRATION PLUG

[75] Inventor: John E. Emory, Jr., Traverse City, Mich.

[73] Assignee: Big Jon, Inc., Traverse City, Mich.

[21] Appl. No.: 100,352

[22] Filed: Sep. 23, 1987

[51] Int. Cl.4 .............................................. F16L 5/00
[52] U.S. Cl. ..................................... 248/56; 248/231.9
[58] Field of Search ................... 248/56, 73, 544, 71, 248/231.91, 231.9, 27.1; 174/152 G, 153 G

[56] References Cited

U.S. PATENT DOCUMENTS

| 2,420,826 | 5/1947 | Irrgang | 174/153 G |
| 3,562,847 | 2/1971 | Jemison | 174/153 G X |
| 4,180,297 | 12/1979 | Abrams | 174/153 G X |
| 4,487,386 | 12/1984 | Hehl | 248/56 |
| 4,668,747 | 8/1987 | Helmsdorfer et al. | 248/56 |

Primary Examiner—Ramon S. Britts
Assistant Examiner—Karen J. Chotkowski
Attorney, Agent, or Firm—Price, Heneveld, Cooper, DeWitt & Litton

[57] ABSTRACT

A cable penetration plug or cap for use in conjunction with an opening in a structure through which at least one cable is passed includes a hollow hub provided with at least one slot along its length, and a flange joined to one end of the hub. The flange is provided with at least one groove aligned with each slot provided in the hub. The bore, slot and groove, collectively define a passageway for receipt of a cable that passes through the opening.

3 Claims, 1 Drawing Sheet

CABLE PENETRATION PLUG

BACKGROUND OF THE INVENTION

The present invention pertains to a plug or cap for covering and securing an electrical cable or the like passing through an opening or penetration, and particularly a plug for use in connection with openings in the hull or cabin of a boat.

The use of electronic devices, such as depth finders and radios, on fishing and pleasure boats has significantly increased in recent years. Some devices may include transducers which mount to the underside of the boat, below the water line, and are electrically connected by cables to equipment in the boat's cockpit. In the past, holes or openings have been drilled through the stern (above the water line) and in the cabin or cockpit area, so that the cables may be passed through the interior of the boat to couple the equipment in the cockpit to the transducer. The openings are typically much larger than the cable, so that a coaxial connector or other enlarged end may pass therethrough. Antenna cables also penetrate or pass through openings in the hull or cabin. This arrangement of having enlarged holes with cables passed therethrough in the cockpit or stern of the boat makes for a disorganized and unsightly array of cables. Furthermore, the cables are subjected to wearing at the openings, due to the sliding, shifting and pulling the cables invariably experience in such an arrangement. Also, a need exists to seal or waterproof the openings at the cable penetration points.

SUMMARY OF THE INVENTION

In accordance with the present invention, a unique electrical cable plug or cap is provided to manage and waterproof the cable penetrations in the hull or cockpit. The plug not only closes the openings, but also supports the cable in an organized and stationary manner.

Essentially, the plug includes a hollow, cylindrical hub which is snugly received within the openings and a flange joined to one end of the hub. The plugs are provided with slots and grooves which collectively define a passageway through which at least one cable may be passed when the plug is received into and closes an opening.

By using the plugs of the present invention, cable management may be effectively and efficiently accomplished. The plugs cover, organize and hold the cables for a neat and appealing appearance. The plugs secure the cables against sliding, shifting and pulling to reduce wear. The plugs close and seal the openings to limit leakage and waterproof the penetration point. Also, due to their construction, the plugs may be easily assembled into an opening through which the cable has already been passed and secured to the electronic equipment.

These and other objects, advantages and features of the present invention will be more fully understood and appreciated by reference to the written specification and appended drawings.

DETAILED DESCRIPTION OF THE PREFERRED EMBODIMENTS

Figure 10:
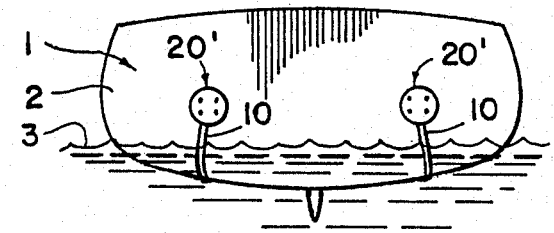
FIG. 10 is a side elevational view of a stern of a boat with the second embodiment of the present invention mounted in openings therein.
Figure 11:
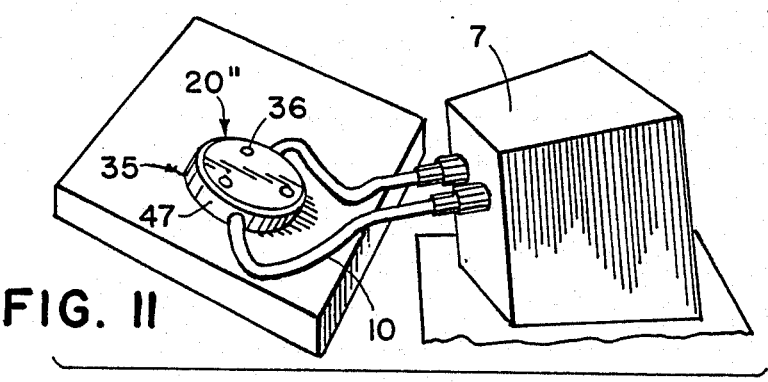
FIG. 11 is a perspective view of a cockpit area of a boat provided with electronic equipment, showing use of the present invention.

In recent years, the use of electronic devices, such as depth finders, have become increasingly popular for use in fishing or pleasure boats 1 (FIG. 10). The devices include transducers which are typically attached to the underside of the boat and electrically connected via cables 10 to equipment 7 in the boat's cockpit (FIG. 11). Openings 5 are drilled in the hull or stern 2 of boat 1 (above the water line 3) for passage of the cables 10. Corresponding openings 5 are also provided in the cockpit area to facilitate connection of cables 10 with the equipment 7 therein. Openings 5 are generally significantly larger than the width of cables 10, to thereby accommodate the coaxial connectors or other enlarged ends of the cables.

Figure 2:
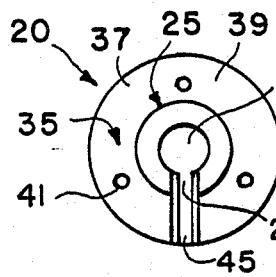
FIG. 2 is a top plan view of the embodiment of FIG. 1.
Figure 1:
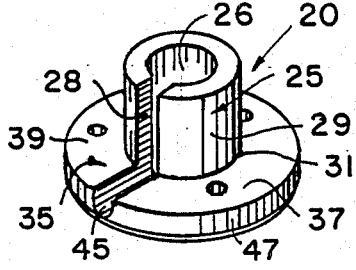
FIG. 1 is a perspective view of an embodiment of the present invention.
Figure 3:
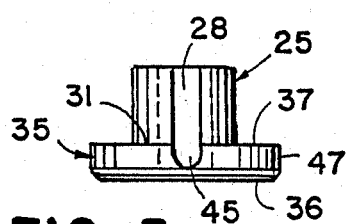
FIG. 3 is a side elevational view of the embodiment of FIG. 1.

A preferred embodiment of a plug or cap in accordance with the present invention is illustrated in FIGS. 1–4 and generally designated by the numeral 20. Plug 20 includes a hub 25 and a flange 35. It is preferred that plug 20 be formed as an integral one-piece member with flange 35 joined to hub 25. The plug is preferably molded from an acetal homopolymer, such as that sold under the trademark Delrin by DuPont, but may also be molded from a wide variety of weather-resistant thermoplastics such as nylon, polyethylene, polypropylene and the like. In the alternative, the plug could be formed from aluminum or other metals. As is seen in FIGS. 1–3, hub 25 includes a sidewall 29 and defines an axially extending bore 26. Hub 25 is dimensioned so that its sidewall 29 is snugly received against the inner surface 6 of opening 5. Passing entirely through sidewall 29, and extending the length of hub 25, is a slot 28.

Figure 4:
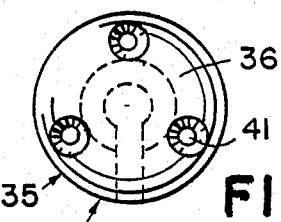
FIG. 4 is a bottom plan view of the embodiment of FIG. 1.
Figure 5:
FIG. 5 is a bottom plan view of a second embodiment of the present invention.

Flange 35 is joined to an end 31 of hub 25. Flange 35 includes forward and rearward surfaces 36, 37. Flange 35 could be of any shape, but is preferably circular and joined concentrically to hub 25. Also, flange 35 has a diameter greater than the diameter of the cylindrical hub 25 so that an annular portion 39 extends around hub 25. Portion 39 is provided with a plurality of mounting holes 41 (FIGS. 4 and 5).

Rearward surface 37 of flange 35 closes bore 26, except along slot 28. A groove 45 defined by flange 35 is aligned with slot 28. Groove 45 extends radially across rearward surface 37 from bore 26 to a sidewall 47 of flange 35. Groove 45 is typically of a U-shaped configuration and is dimensioned slightly larger than the cable that it is to be received therein. Groove 45, in use, opens against the supporting structure (such as stern 2)

to cooperate therewith to form a channel through which cable 10 may be passed and secured in place. Further, in rearward surface 37, aligned with and as an extension of bore 26, is a recess 49 which is of the same depth as groove 45. This arrangement permits cable 10 to easily make the 90° bend necessitated by passing through plug 20. Hence, bore 26, slot 28, groove 45 and recess 49 collectively define a passageway 21 through which cable 10 is received and passed.

Figure 8:
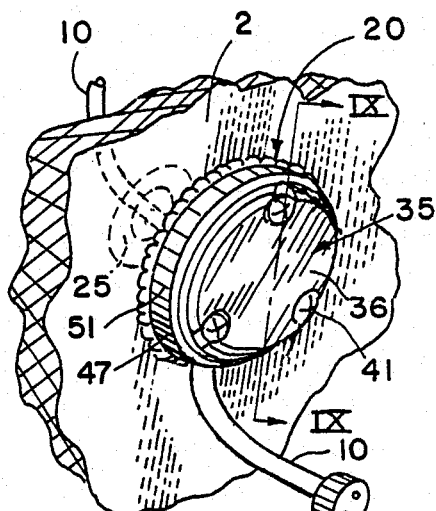
FIG. 8 is a perspective view showing the embodiment of FIG. 1 mounted in the stern of a boat.
Figure 9:
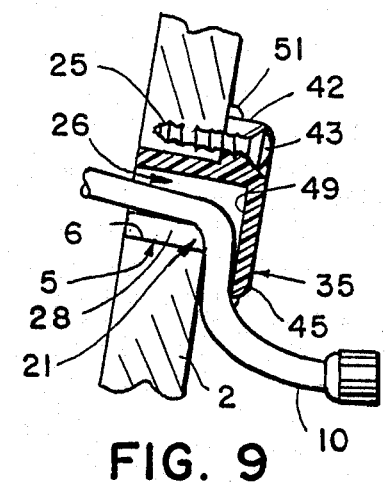
FIG. 9 is a cross-sectional view taken generally along line IX—IX of FIG. 8.

In a typical installation, openings 5 are drilled through stern 2 of boat 1 (FIGS. 8–10) and in a portion of the cockpit near equipment 7 (FIG. 11). Cables 10 are then strung through the respective openings 5 and connected to the desired equipment on the hull and in the cockpit. At any time after cables 10 are in place, plugs 20 are mounted in openings 5. Slots 28 are aligned with cables 10 and permit hub 25 to be inserted over cable 10 and into opening 5. Annular portion 39 of flange 35 is positioned against stern 2. Screws 43 are passed through holes 41 in flange 35, and into stern 2 to securely hold plug 20 in place (FIGS. 8 and 9). In this position, cable 10 is received through bore 26 and groove 45 as it passes through opening 5. Passageway 21 then acts to securely hold cable 10 in place in a neat and organized fashion. Plug 20 holds cable 10 to limit or prevent sliding or shifting. The tendency for cable 10 to wear along opening 5 is substantially reduced. To reduce water leakage and make the opening waterproof (though not watertight) a bead of silicone rubber or the like 51 is placed around sidewall 47 of flange 35 and between flange 35 and the hull surface.

Figure 6:
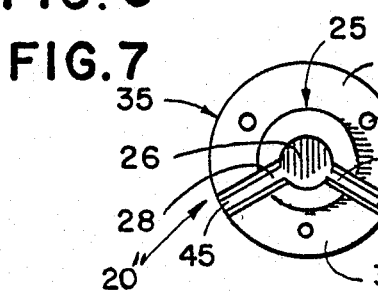
FIG. 6 is a perspective view of a third embodiment of the present invention.
Figure 7:
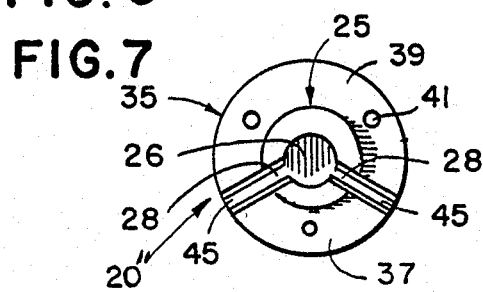
FIG. 7 is a top plan view of the embodiment of FIG. 6.

In view of the foregoing description, various modifications should now be apparent to one of ordinary skill in the art. For example, in alternative embodiments, a plurality of slots 28 and grooves 45 (generally up to three) may be provided in plug 20 to accommodate a plurality of cables 10 passing through the same opening 5. Plug 20" shown in FIGS. 6 and 7 is an example of an embodiment which accommodates a pair of cables 10. Plug 20" defines a pair of angularly related slots 28 and grooves 45. Each slot and groove receives a cable 10 that is passed through opening 5. If three cables 10 were passed through opening 5, then a third slot 28 and groove 45 would be formed in the plug. Also note, that while plug 20" is provided with slots 28 and grooves 45 which are positioned approximately 60° apart, different configurations may be used.

Therefore, it should be understood that the above description is merely that of the preferred embodiments of the invention. The true spirit and scope of the present invention may be determined by reference to the appended claims.

The embodiments of the invention in which an exclusive property or privilege is claimed are defined as follows:

1. A cable penetration plug for use in conjunction with an opening in a structure such as a boat through which at least one cable is passed, said plug comprising:

a rigid cylindrical hub having with a side wall, an axial bore extending therethrough, and at least one slot extending along said hub and passing through said side wall, said slot dimensioned to receive a cable; and a rigid flange joined to an end of said hub and having at least one groove, said flange further including a recess adjacent said bore, said groove having a depth and being of substantially the same width as said slot and said groove being aligned with said slot and defining a channel, said bore, said slot and said groove collectively defining a continuous passageway through which said cable is received and held when said cable is passed through said opening, said flange having a forward surface and a rearward surface, said groove opening through said rearward surface and wherein said recess is an extension of said bore and has a depth substantially equal to the depth of said groove.

2. The plug of claim 1 in which said flange is of a larger transverse dimension than said hub which thereby defines an annular portion which extends beyond said hub, said annular portion defining at least one hole adapted to receive a fastener which fixedly secures said plug to said boat, and wherein said plug further includes a bead of silicone on said flange.

3. The plug of claim 1 in which said hub and flange are formed as a unitary piece of rigid material and wherein said hub defines a plurality of said slots and said flange defines a plurality of said grooves, each of said grooves aligned with one of said slots.

* * * * *